Oct. 9, 1951        A. L. DAHL        2,570,527
BELT LOOSENING AND TIGHTENING DEVICE
Filed Jan. 4, 1949
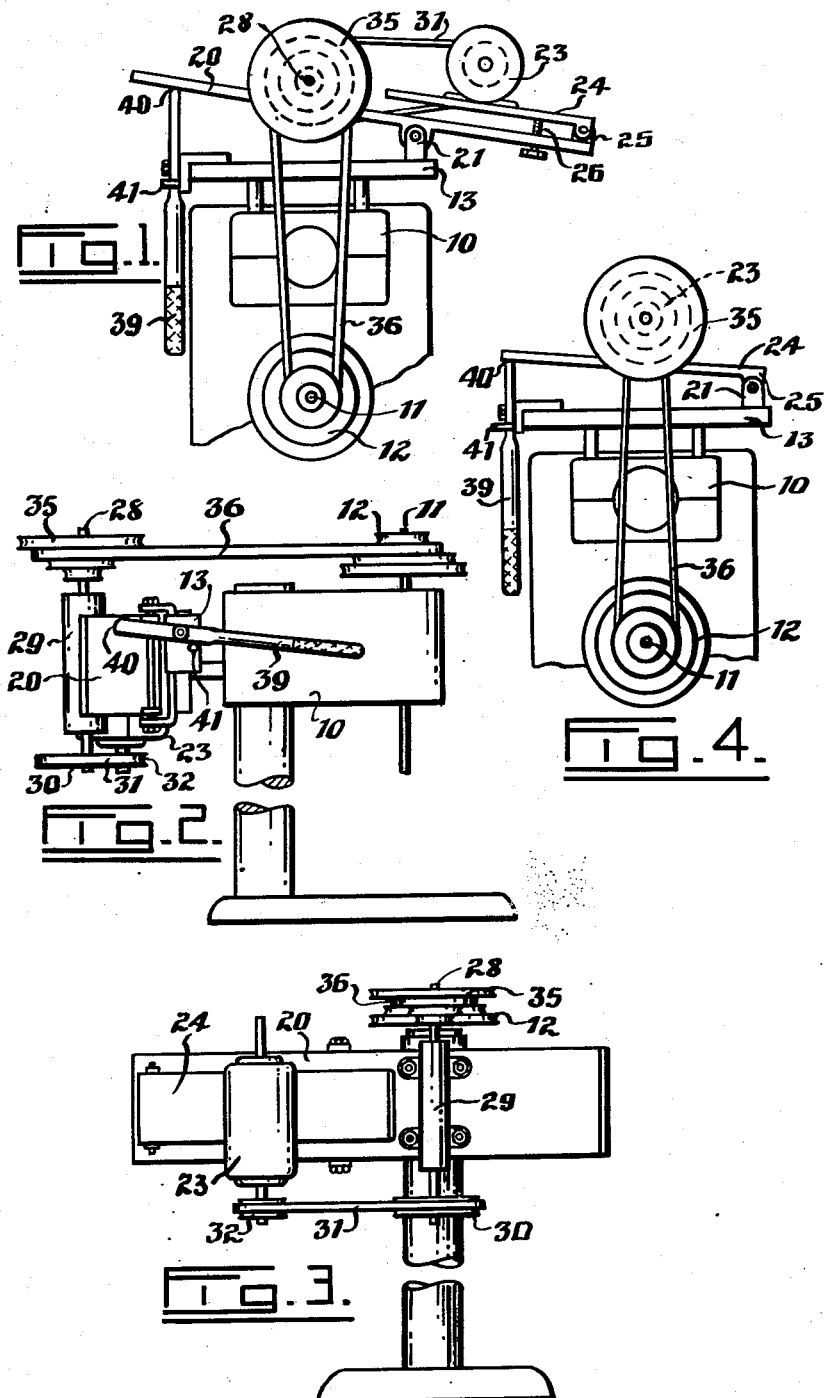
INVENTOR
ARTHUR. L. DAHL
BY
Fetherstonhaugh & Co.
ATTORNEYS Patented Oct. 9, 1951

2,570,527

UNITED STATES PATENT OFFICE 2,570,527

BELT LOOSENING AND TIGHTENING DEVICE

Arthur L. Dahl, Vancouver, British Columbia, Canada

Application January 4, 1949, Serial No. 69,107

2 Claims. (Cl. 74—242.15)

This invention relates to a device for loosening and tightening belts on a machine having a shaft to be rotated by a motor, such as for example, a drill press.

An object of the present invention is the provision of a device by means of which a belt may be quickly and easily changed on step pulleys.

Another object is the provision of a device for prolonging the life of belts by enabling them to be loosened when not required, and eliminating the stretching of the belts when they are being changed on step pulleys.

A further object is the provision of a belt loosening and tightening arrangement for machines, such as drill presses, by means of which a greater variation of speeds may be obtained than is normally possible.

While this device may be used in any type of machine employing pulley belts, it will for the sake of clarity hereinafter be described in connection with a drill press. At present, in drill presses, a belt usually connects a driven step pulley to another step pulley on a shaft which rotates the drill. These belts must be kept tight which means that they are always under strain, and when it is desired to change them on the step pulleys, it is necessary to stretch them over the sections between the belt grooves thereof.

This belt loosening and tightening device consists of a main base plate hingedly mounted between the ends thereof on a support which forms part of the drill press. A motor is mounted at one end of the plate and a jack shaft is carried by the plate spaced from the motor. A belt connects a pulley on this shaft to another pulley on the motor. A step pulley on the jack shaft is connected by a belt to a step pulley on the shaft of the drill press, while suitable means is provided on the support for engaging the end of the base plate remote from the motor to move said end away from the support to tighten the belt between the step pulleys. This means may be operated to permit the plate end to move towards the support to loosen said belt. If desired, the motor may be mounted on a base plate which is hingedly mounted adjacent the end at one end of the main base plate. In this case, means is provided for adjusting the position of the free end of the motor base plate in relation to the main base plate to adjust the tension on the belt between the motor shaft pulley and the pulley on the jack shaft.

Examples of this invention are illustrated in the accompanying drawings, in which, Figure 1 is a plan view of the device on a drill press, Figure 2 is an end elevation of the device, Figure 3 is a view of the device looking towards the back of the drill press, and Figure 4 is a plan view of an alternative arrangement of this invention.

Referring to the drawings, 10 is a drill press of the usual construction having a vertical shaft 11 which turns the drill, said shaft having a step pulley 12 at the upper end thereof. The drill press is provided with the usual support 13 near the top and at the back thereof.

A main base plate 20 is mounted by means of a hinge 21 between the ends thereof on one end of the support 13. A motor 23 may be mounted directly on this base plate at one end thereof, or as shown, it may be mounted on a motor base plate 24 which is mounted by a hinge 25 adjacent one end thereof on the end of the main base plate 20. In this case, an adjusting screw 26 is threaded through the main plate and bears against the inner surface of the motor plate 24.

A vertical jack shaft 28 is mounted in a suitable bearing 29 carried by the main base plate behind the support 13. A pulley 30 mounted on the lower end of this shaft is connected by a drive belt 31 to a pulley 32 mounted on the shaft of the motor 23. These pulleys may be of any desired size in relation to each other and, in this example, pulley 30 is larger than pulley 32 in order to secure a speed reduction. A step pulley 35 is mounted on the upper end of the jack shaft and is connected by a machine belt 36 to the step pulley 12 of the drill press.

Suitable means is provided on the machine support 13 for engaging the end of the main base plate remote from the motor to move said end to tighten or loosen the belt 36. A very simple and convenient way of doing this is by means of a lever arm 39 pivotally mounted on the end of the support 13. This lever arm is provided with a cam surface 40 at one end for engaging the free end of the main base at a point remote from its hinge. A stop 41 on the support 13 to one side of the lever arm pivot is adapted to limit the movement of the lever when the cam surface 40 has been moved past the centre when the belt is tightened. The machine belt is tight when the lever arm is substantially normal to the main base plate. The strip 41 stops the lever arm when it is moved past its position normal to the base plate, the tension of the belt 36 locking the lever arm in this position. The belt tension is released when the lever arm is moved away from the stop to the opposite side of said normal position.

When the motor 23 is mounted on a separate base plate, the tension of the belt 31 may be adjusted by tightening or loosening the screw 26 which moves the free end of the motor base plate 24 away from or towards the main base plate 20. When the lever 39 is pivoted until its bearing surface 40 engages the adjacent end of the main base plate 20 and moves said end outwardly, the belt 36 is tightened. As soon as the bearing surface has been moved past the centre, the lever engages the stop 41 so that said bearing surface cannot move any further and it is locked in this position. When it is desired to change the belt 36 on the pulleys 12 and 35, it is only necessary to pivot the lever 39 to permit the end of the plate 20 to move towards the support 13. This may also be done when it is desired to relieve the tension on this belt when the drill press is not required.

From this it will be seen that the belt 36 may be changed on its pulleys quickly and easily, and without being stretched in any way. The pulley and belt connection between the jack shaft and the motor affords another opportunity for changing the speed of the shaft of the drill press. In this case, there is a speed reduction at this point.

If desired, the pins of the hinges 21 and 25 may be pulled out, the main base plate 20 removed, and the portion of the hinge 25 mounted on the plate 24 may be connected to the portion of the hinge 21 remaining on the support 13 by one of the pins. In this case, the pulley 35 would be mounted directly on the shaft of the motor. This arrangement is a direct connection between the motor shaft and the drill press shaft, while the lever arm 39 may still be used to enable the belt 36 to be changed on the step pulleys or to be loosened when not required. Furthermore, the motor and its base may be removed and used on other machines.

What I claim as my invention is:

1. A belt loosening and tightening arrangement for a machine having a shaft carried by a suitable support to be rotated by a motor, comprising a main base plate adapted to be hingedly mounted between its ends on a support of the machine, a motor base plate hingedly mounted adjacent one end at one end of the main plate, a motor mounted on the motor plate, means for adjusting the position of the free end of the motor plate in relation to the main plate, a jack shaft rotatably mounted on the main base plate, pulleys on the jack shaft and the motor shaft connected by a belt, a pulley on the jack shaft connected by a belt to a pulley on a machine shaft to be rotated, and means on the machine support for engaging the end of the main base plate remote from the motor to move said end to tighten or loosen the belt between the jack and machine shaft pulleys.

2. A belt loosening and tightening arrangement for a machine having a shaft carried by a suitable support to be rotated by a motor, comprising a main base plate removably and hingedly mounted between its ends on a support of the machine, a motor base plate removably and hingedly mounted adjacent one end at one end of the main plate, a motor mounted on the motor plate, a screw for adjusting the position of the free end of the motor plate in relation to the main plate, a jack shaft rotatably mounted on the main base plate, pulleys on the jack shaft and the motor shaft connected by a belt, a pulley on the jack shaft connected by a belt to a pulley on a machine shaft to be rotated, and means on the machine support for engaging the end of the main base plate remote from the motor to move said end to tighten or loosen the belt between the jack and machine shaft pulleys.

ARTHUR L. DAHL.

REFERENCES CITED

The following references are of record in the file of this patent:

UNITED STATES PATENTS

| Number | Name | Date |
| --- | --- | --- |
| 528,608 | Richter | Nov. 6, 1894 |
| 1,799,261 | Stoody | Apr. 7, 1931 |
| 2,165,754 | Hornack | July 11, 1939 |
| 2,284,441 | Murad | May 26, 1942 |
| 2,372,342 | Smith et al. | Mar. 27, 1945 |